United States Patent [19]
Oura et al.

[11] Patent Number: 6,097,370
[45] Date of Patent: Aug. 1, 2000

[54] X-Y DIRECTION INPUT DEVICE

[75] Inventors: Nobuhiro Oura; Akihisa Itoh, both of Fukushima-ken, Japan

[73] Assignee: Alps Electric Co., Ltd., Tokyo, Japan

[21] Appl. No.: 08/942,600

[22] Filed: Oct. 2, 1997

[30]    Foreign Application Priority Data

Oct. 9, 1996    [JP]    Japan ..................................... 8-287641

[51] Int. Cl.[7] ...................................................... G09G 3/02
[52] U.S. Cl. ......................... 345/163; 345/166; 345/167
[58] Field of Search ................................... 345/163, 164,
345/165, 166, 167, 168, 169, 156, 157,
158, 145, 146; 273/148 B, 148 R; 74/471 XY;
D14/117.2, 117.3, 117.4, 117.5

[56]                References Cited

U.S. PATENT DOCUMENTS 4,612,539   9/1986   Hosogoe .................................. 345/164
4,786,892  11/1988   Kubo et al. .............................. 341/20
4,806,917   2/1989   Hosogoe .................................. 345/164
5,815,140   9/1998   Kitazawa ................................ 345/164
5,828,364  10/1998   Siddiqui ................................. 345/163

Primary Examiner—Richard A. Hjerpe
Assistant Examiner—Marthe Y. Marc-Coleman
Attorney, Agent, or Firm—Brinks Hofer Gilson & Lione

[57]                ABSTRACT

Disclosed is an X-Y direction input device which requires a smaller number of parts and is less costly. Frictional force applying means comprises a rolling contact roller held in rolling contact with a rotated spherical body, a resilient member inserted in a through hole formed at the axial center of the rolling contact roller, and support members holding both ends of the resilient member.

2 Claims, 7 Drawing Sheets

X-Y DIRECTION INPUT DEVICE

BACKGROUND OF THE INVENTION

1. Field of the Invention

The present invention relates to an X-Y direction input device, and more particularly to an X-Y direction input device called a mouse (trade name).

2. Description of the Related Art

A computer system is basically made up of a display screen, a display controller, data, various input devices and so on.

There are known various forms of input devices up to now. As one of those input devices, an X-Y direction input device called a "mouse" (trade name) has been developed in which when a case is moved on a base in any desired direction, the direction and amount of movement of the case is detected.

Such an X-Y direction input device is basically made up of a rotated spherical body (referred to simply as a spherical body hereinafter) formed of a steel ball, for example, a first driven roller contacting the spherical body to be rotatable by rotating force of the spherical body, a second driven roller contacting the spherical body to be rotatable by rotating force of the spherical body and having an axis substantially perpendicular to the axis of the first driven roller, first and second rotational amount detecting means formed by rotary electrical parts, such as variable resistors or encoders, for individually detecting respective amounts of rotation of the first and second driven rollers, and a case for housing the spherical body, the first and second driven rollers, and the first and second rotational amount detecting means.

An opening is formed in a lower wall of the case so that part of the spherical body projects downward through the opening. When an operator holds the case by the hand and rolls it on a predetermined base in any desired direction, the first and second driven rollers rotate respectively in the predetermined directions. The first and second rotational amount detecting means take out the directions and amounts of rotation of the driven rollers in the form of voltage or digital signals indicating components of the rotation in the X-axis and Y-axis directions. These signals are input to a display device of the computer system.

In the X-Y direction input device thus constructed, frictional force applying means is required to resiliently urge the spherical body toward the first driven roller and the second driven roller under even forces for applying frictional forces between the spherical body and both the driven rollers.

A typical example of conventional frictional force applying means will be described with reference to FIGS. 13 and 14.

The conventional frictional force applying means comprises a rolling contact roller 57' of synthetic resin, a roller support member 58' for supporting the rolling contact roller 57', a container 17' for supporting the roller support member 58', and a coil spring 59'.

The roller support member 58' formed of a molding of synthetic resin has a pair of rotary support shafts 58'*a* provided on its upper side walls, and a spring receiving projection 58'*b* (see FIG. 14) provided on its lower back surface. Further, a bearing portion 58'*c* is formed to be open forward in a middle position between the rotary support shafts 58'*a* and the spring receiving projection 58'*b*. Both ends of a support shaft 60' inserted through the rolling contact roller 57' is press-fitted to the bearing portion 58'*c* so that the rolling contact roller 57' is rotatably supported by the roller support member 58' with the support shaft 60' serving as a rotary shaft.

The roller support member 58' thus constructed is inserted into an open room 17'*a* of the container 17' in such a state that the coil spring 59' is fitted at its one end over the spring receiving projection 58'*b*. With the insertion of the roller support member 58', as shown in FIG. 14, the rotary support shafts 58'*a* of the roller support member 58' enter cutout portions 17'*b* in opposite walls of the container 17', whereby the coil spring 59' is held in a compressed state between the roller support member 58' and an inner wall of the container 17'. The resulting resilient force of the coil spring 59' urges the roller support member 58' to rotate clockwise, as viewed on the drawing, about the rotary support shafts 58'*a* as fulcra. By virtue of the biasing force, part of the rolling contact roller 57' supported by the roller support member 58' slightly projects out of the container 17' toward the opening where the spherical body is placed, and an outer wall of the roller support member 58' comes into abutment with an inner wall of the container 17'. The roller support member 58' and the rolling contact roller 57' are thereby prevented from displacing.

With the above conventional structure, the spherical body can be pressed upon both the driven rollers under even forces by arranging the rolling contact roller and the coil spring on a straight line connecting a point where the axes of the first and second driven rollers cross each other and the center of the spherical body.

The conventional frictional force applying means, however, requires a large number of parts and is costly because it is made up of four independent components; i.e., the rolling contact roller 57' of synthetic resin, the roller support member 58' for supporting the rolling contact roller 57', the container 17' for supporting the roller support member 58', and the coil spring 59'. Another problem is that the roller support member 58' is less cost effective in manufacture and machining because of its complicated configuration.

SUMMARY OF THE INVENTION

An X-Y direction input device of the present invention comprises a rotated spherical body arranged in a rotatable manner, a first driven roller contacting the rotated spherical body to be rotatable by rotating force of the rotated spherical body, a second driven roller contacting the rotated spherical body to be rotatable by rotating force of the rotated spherical body and having an axis substantially perpendicular to the axis of the first driven roller, first rotational amount detecting means for detecting an amount of rotation of the first driven roller, second rotational amount detecting means for detecting an amount of rotation of the second driven roller, and frictional force applying means for resiliently urging the rotated spherical body toward the first driven roller and the second driven roller, thereby applying frictional forces between the rotated spherical body and both the driven rollers, the frictional force applying means comprising a rolling contact roller held in rolling contact with the rotated spherical body, a resilient member inserted in a through hole formed at the axial center of the rolling contact roller, and support members holding both ends of the resilient member.

In the X-Y direction input device of the present invention, preferably, the resilient member is a coil spring, both ends of the coil spring being attached to the support members which are provided on the side nearer to the rotated spherical body than the axial center of the rolling contact roller.

In the X-Y direction input device of the present invention, preferably, the coil spring is wound such that a central portion is a fine-pitch spring and both end portions are coarse-pitch springs.

DESCRIPTION OF THE PREFERRED EMBODIMENT

An X-Y direction input device according to one embodiment of the present invention will be described hereunder with reference to the drawings.

Figure 2:
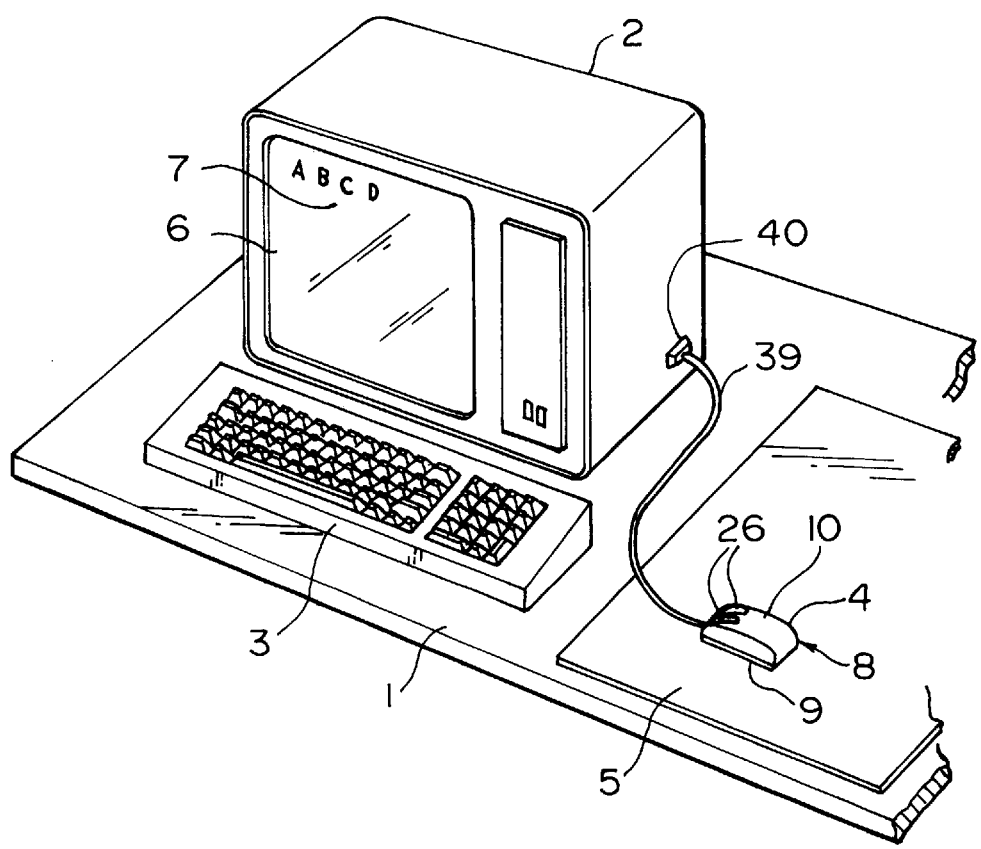
FIG. 2 is a perspective view of a graphic display system including an X-Y direction input device according to one embodiment of the present invention.

FIG. 2 is a perspective view of an entire computer system including the X-Y direction input device.

In FIG. 2, on a table 1, there are placed a display device 2 including a screen 6, a controller and a data channel, an input device 3 having function keys, etc., and an input device 4 for moving a cursor in X-Y directions and entering an instruction. The input device 4 is operated on a specific sheet 5 laid on the table 1, whereupon a cursor 7 indicated on the screen 6 of the display device 2, for example, can be moved to a desired position.

Figure 3:
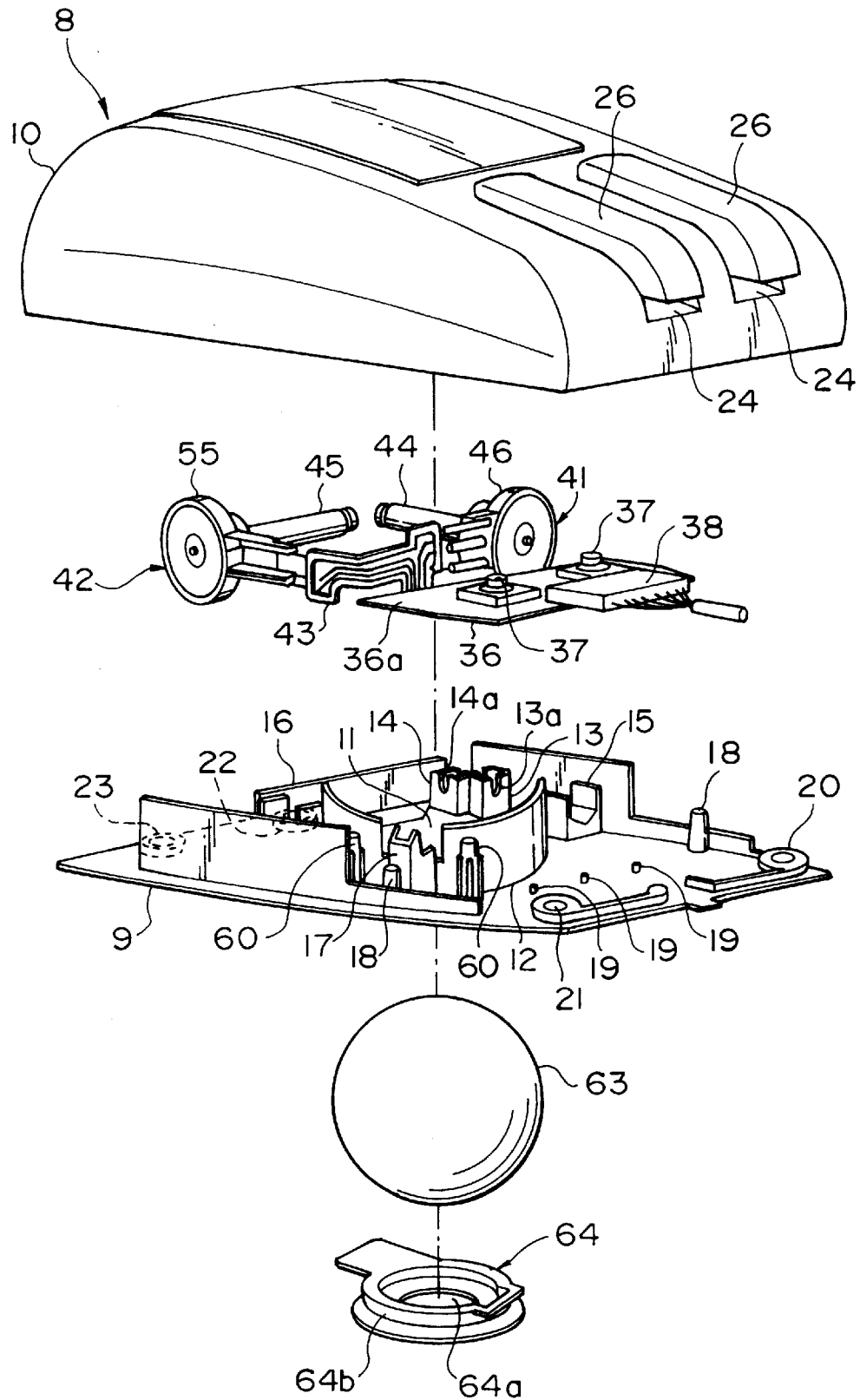
FIG. 3 is an exploded perspective view of the input device of the present invention.
Figure 4:
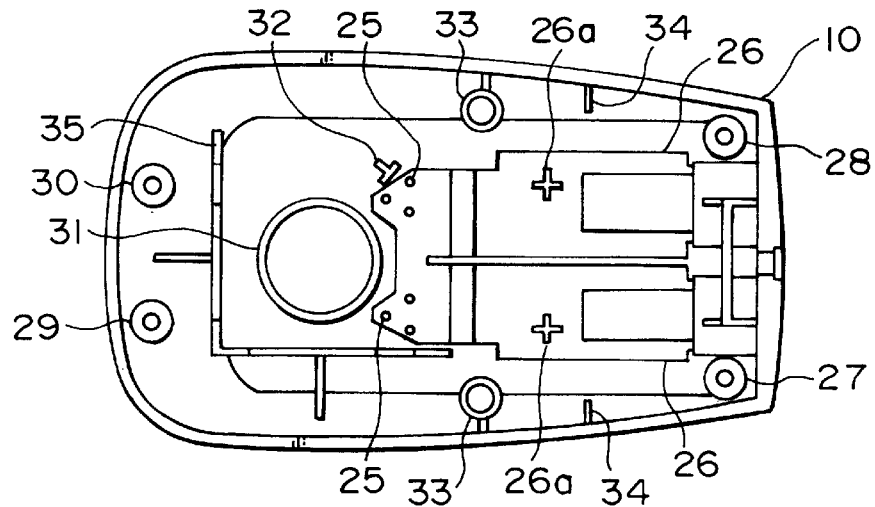
FIG. 4 is a bottom view of an upper case of the input device of the present invention.
Figure 5:
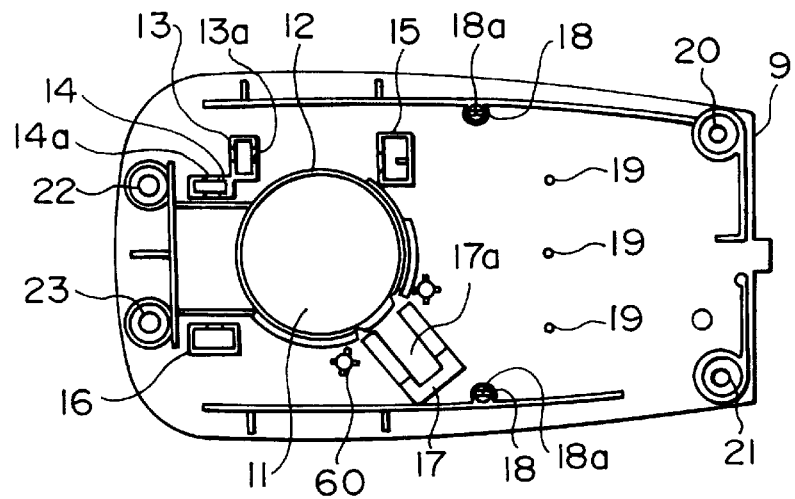
FIG. 5 is a top view of a lower case of the input device of the present invention.
Figure 6:
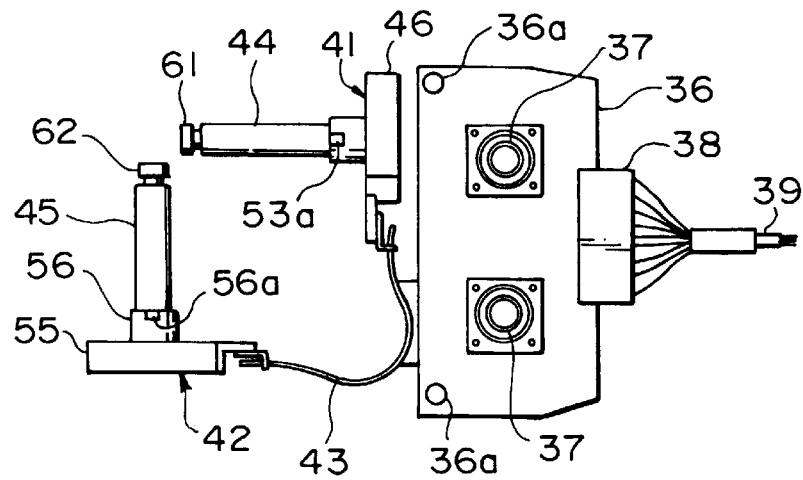
FIG. 6 is a top view of primary parts of a detecting unit in the input device of the present invention.

FIG. 3 is an exploded perspective view of primary components of the input device 4, and FIGS. 4–6 are views for explaining the primary components of the input device 4 in which; FIG. 4 is a bottom view of an upper case, FIG. 5 is a plan view of a lower case, and FIG. 6 is a plan view of a detecting unit.

As shown in these drawings, a case 8 forming an outer shell of the input device 4 comprises a lower case 9 and an upper case 10 which are formed of, e.g., an ABS resin. The lower and upper cases 9, 10 are joined by screws, not shown, into a one-piece structure.

Centrally of the lower case 9 in its rear portion (on the left side in FIG. 5), a large-diameter opening 11 is bored and a peripheral wall 12 is erected along a peripheral edge of the opening 11. Also, around the opening 11, there are erected two bearing retainers 13, 14 having recessed slots 13a, 14a formed therein, and two holder retainers 15, 16 being a little larger than the bearing retainers 13, 14. The bearing retainers 13, 14 and the holder retainers 15, 16 serve to hold and position driven rollers and rotational amount detecting means described later. One 13 of the bearing retainers and one 15 of the holder retainers cooperate as one pair, while the other bearing retainer 14 and the other holder retainer 15 cooperate as the other pair. These two pairs of retainers are disposed such that their center lines (axes) cross each other perpendicularly.

A spherical body 63 is placed in the opening 11 of the lower case 9 and held by a lid member 64 not to displace from the opening 11.

Near the peripheral wall 12, a container 17 having an open room 17a formed therein is provided integrally with the lower case 9. The container 17 serves to contain and hold frictional force applying means described later. A pair of posts 60, 60 are erected near the container 17 integrally with the lower case 9.

On the lower case 9, there are further erected a pair of elastic projections 18, 18 near the holder retainer 15 and the container 17, respectively, and three support projections 19 near the elastic projections 18, 18. The elastic projections 18, 18 serve to position a switch board, described later, relative to the lower case 9 and the support projections 19 serve to support the switch board. Additionally, screw insertion holes 20, 21, 22, 23 are bored through the lower case 9 in two front positions and two rear positions.

The upper case 10 is designed to have such a size as allowing an operator to operate the device while holding it by one hand. A pair of fitting holes 24 are formed in a curved upper wall portion of the upper case 10 on the front side. As is apparent from FIG. 4, a plurality of fusible pins 25 are vertically provided on an inner surface of the upper wall portion of the upper case 10. Two switch levers 26 are joined to each other at one ends thereof and fixed to the upper case 10 by the fusible pins 25. This fixation is carried out by fitting small holes formed in the switch levers 26 through the fusible pins 25 and then fusing tips of the fusible pins 25 to fix the switch levers 26 in place by caulking. Thus, the switch levers 26 are angularly movable by virtue of their own resiliency about the caulked ends as fulcra. In a state after being fixed to the upper case 10, operating ends of the switch levers 26 are positioned to slightly project out of the respective fitting holes 24.

In and on the inner surface of the upper wall portion of the upper case 10, there are also formed screw insertion holes 27, 28, 29, 30 in positions corresponding to the insertion holes 20, 21, 22, 23 of the lower case 9, an annular rib 31 in a position corresponding to the opening 11, a pressing projection 32 in a position corresponding to the container 17, tubular projections 33 in positions corresponding to the elastic projections 18, and a pair of pressing ribs 34 in positions near the tubular projections 33. Further, from the inner surface of the upper wall portion of the upper case 10, there is projected an L-shaped pressing wall 35 in a position corresponding to the bearing retainers 13, 14 and the holder retainers 15, 16, i.e., extending along the center line of one pair of the bearing retainer 13 and the holder retainer 15 and the center line of the other pair of the bearing retainer 14 and the holder retainer 16.

Primary components of the detecting unit shown in FIG. 6 are accommodated between the lower case 9 and the upper case 10. Referring to FIG. 6, a switch board 36 made of relatively hard insulating materials, e.g., a phenol resin, has two positioning holes 36a bored therein corresponding to the elastic projections 18 of the lower case 9. Two push switches 37 and a connector 38 are fixedly soldered onto the switch board 36 and connected to each other by pattern wiring (not shown) formed on a rear surface of the switch board 36.

The push switches 37 are switches of the input device 4 itself, and are used to carry out processing of various signals indicating, e.g., omission of part of a pattern displayed just above the cursor 7 in the display device 2, copying of the part to a different display position, and other switchover and control operations. The display device 2 and the input device 4 are interconnected by a cord 39 and a socket plug 40, as shown in FIG. 2.

A flexible film board 43 having a desired pattern wiring formed thereon and partly bent is soldered to each of the switch board 36 and first and second encoders 41, 42 as the frictional force applying means. Further, first and second driven rollers 44, 45 are coupled respectively to the first and second encoders 41, 42.

Metal bearings 61, 62 are fixed to respective one ends of the first and second driven rollers 44, 45.

As is apparent from the above description, therefore, the first and second driven rollers 44, 45, the first and second encoders 41, 42 coupled respectively to the rollers 44, 45, and the switch board 36 including the push switches 37, the connector 38, etc. mounted thereon are not only constructed into a one-piece unit, but also electrically connected to each other beforehand through the flexible film board 43.

Figure 7:
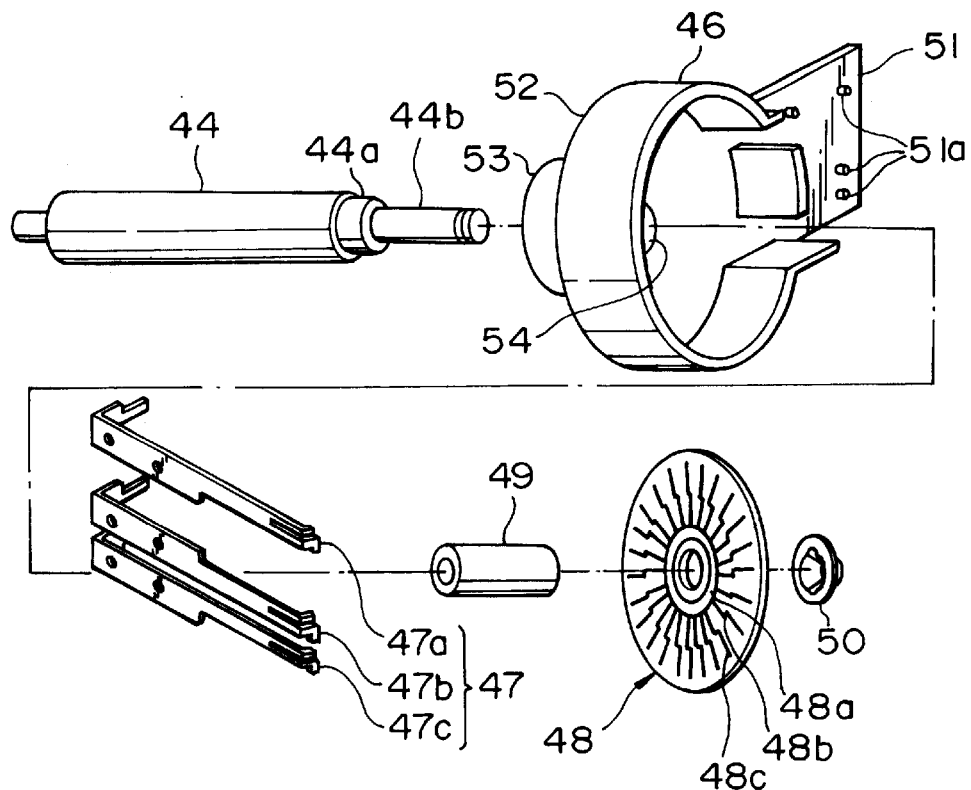
FIG. 7 is an exploded perspective view of a driven roller and an encoder for use in the input device of the present invention.
Figure 8:
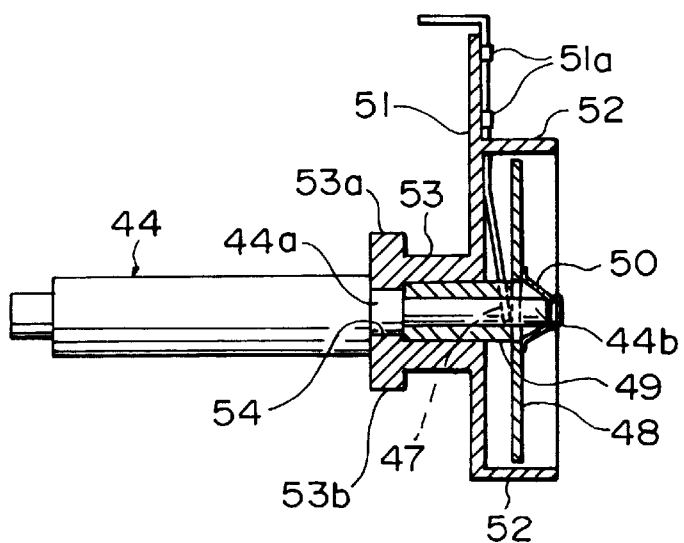
FIG. 8 is a sectional view of an assembly of the driven roller and the encoder for use in the input device of the present invention.

FIGS. 7 and 8 are explanatory views of an internal structure of the first encoder 41 in which; FIG. 7 is an exploded perspective view and FIG. 8 is a sectional view in an assembled state.

As shown in these drawings, the first encoder 41 comprises a holder 46 forming an outer shell of the encoder, three sliders 47a, 47b, 47c, a cord plate 48 having a common pattern 48a at the center, an inner peripheral pattern 48b around the common pattern 48a and an outer peripheral pattern 48c around the inner peripheral pattern 48b, a tubular spacer 49, and a lock nut 50.

The holder 46 includes a flat portion 51, an annular peripheral wall 52 formed on one side of the flat portion 51, and a cylindrical bearing portion 53 formed on the other side of the flat portion 51. The bearing portion 53 is partly projected in vertically opposite positions on its peripheral surface, respectively, into a projection 53a and a positioning projection 53b. The bearing portion 53 is formed at the center of the peripheral wall 52 and has a stepped insertion hole 54 formed therethrough for insertion of an inserted shaft portion 44b described later.

A plurality of fusible pins 51a are erected on the flat portion 51 in an area away from the peripheral wall 52, and the sliders 47a, 47b, 47c are fixed at their one ends to the flat portion 51 by the fusible pins 51a. Opposite free ends of the sliders 47a, 47b, 47c thus fixed at their one ends by the fusible pins 51a project into the interior of the peripheral wall 52 through a cutout formed in part of the peripheral wall 52.

On the other hand, at one end of the first driven roller 44, there are formed an engagement shaft portion 44a being slightly smaller in diameter than a main shaft portion thereof, and an inserted shaft portion 44b being even smaller in diameter than the engagement shaft portion 44a. The engagement shaft portion 44a and the inserted shaft portion 44b are inserted into the insertion hole 54 from the side of the bearing portion 53. The spacer 49 and the cord plate 48 are successively fitted over the inserted shaft portion 44b of the first driven roller 44 which has been inserted through the insertion hole 54 and has reached the interior of the peripheral wall 52. After that, the lock nut 50 is fitted over a tip end of the inserted shaft portion 44b, thereby fixing the cord plate 48 to the first driven roller 44. At this time, a step of the first driven roller 44 between the main shaft portion and the engagement shaft portion 44a comes into abutment with a peripheral edge of the insertion hole 54, while one end of the spacer 49 comes into abutment with a step on an inner wall of the insertion hole 54. The first driven roller 44 is therefore coupled to the first encoder 41 in such a state that its axial movement is restricted. Also, the cord plate 48 is fixed to the first driven roller 44 in such a state that the distance from the flat portion 51 is restricted by the spacer 49.

By assembling the first driven roller 44 and the cord plate 48 to the holder 46 in such a way, the first, second and third sliders 47a, 47b, 47c come into resilient contact with the common pattern 48a, the inner peripheral pattern 48b and the outer peripheral pattern 48c, respectively. Because the sliders 47a, 47b, 47c are supported at their fulcra away from the cord plate 48, as stated above, the span from the resilient contact points of the sliders with the cord plate 48 to the fulcra can be set to be so long that stable sliding torque is obtained.

The first encoder 41 is structured as explained above and the second encoder 42 has the same structure as the first encoder 41. More specifically, the second encoder 42 basically comprises a holder 55 (see FIGS. 3 and 6) forming an outer shell of the encoder, three sliders supported by the holder 55, and a cord plate held in contact with the sliders. The cord plate is fixed to one end of the second driven roller 45. A bearing portion 56 is projected on one side of the holder 55, and has a projection 56a formed at the top thereof and a positioning projection (not shown) at the bottom thereof.

Note that the rotational amount detecting means is described as being of contact type comprising the first and second encoders 41, 42 and the sliders, the present invention is not limited to the illustrated embodiment and the rotational amount detecting means may be of optical type comprising photodiodes and encoders.

The frictional force applying means will now be described by primarily referring to FIG. 1.

Figure 1:
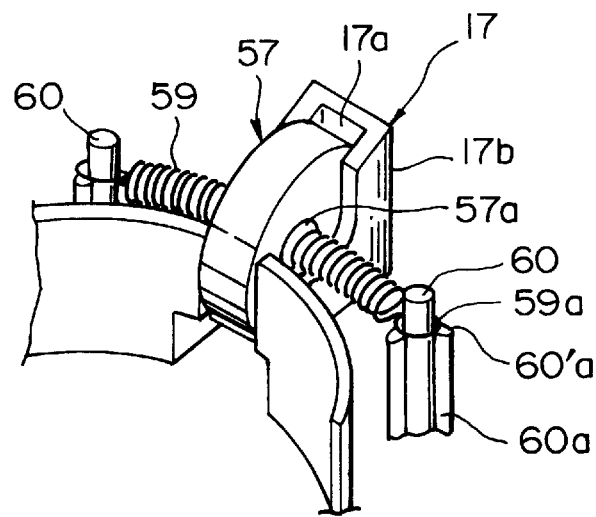
FIG. 1 is a perspective view of frictional force applying means, made up of a rolling contact roller, posts, a container and a coil spring, for use in one embodiment of the present invention.

As shown in FIG. 1, the frictional force applying means comprises a rolling contact roller 57 of synthetic resin, the aforesaid container 17 for receiving part of the rolling contact roller 57, a coil spring 59 as a resilient member, and a pair of posts 60, 60 as hold members for holding both ends of the coil spring 59.

A through hole 57a is formed at the axial center of the rolling contact roller 57. The coil spring 59 is disposed to penetrate the through hole 57a and has both ends 59a, 59a caught by upper ends of the pair of posts 60, 60 each having a columnar shape. The rolling contact roller 57 is thereby held rotatably while being urged by the coil spring 59.

The container 17 is formed integrally with the lower case 9 and has a side wall projecting upward from the lower case 9 and being channel-shaped in horizontal section. The open room 17a is defined inside the channel-shaped side wall 17b.

Part of the rolling contact roller 57 through which the coil spring 59 is inserted is received in the open room 17*a* of the container 17 in a floating condition. The rolling contact roller 57 is restricted by the side wall 17*b* in its position in the right and left direction so as to locate substantially at the center of the coil spring 59. The posts 60 are provided integrally with the lower case 9 to project upward from the lower case 9, and are positioned on the side nearer to the spherical body 63 than the axial center of the rolling contact roller 57.

Accordingly, the coil spring 59 held by the posts 60 urges the rolling contact roller 57 toward the side of the spherical body 63, causing part of the rolling contact roller 57 to project into the peripheral wall 12 through a cut slot formed in the peripheral wall 12.

In addition, a cross-shaped auxiliary post 60*a* is integrally formed around each of the columnar posts 60 with a height lower than the central post 60.

The coil spring 59 is a spring comprised of windings finely coiled over the entire spring with a small pitch. The finely wound spring can be manufactured with ease. But the configuration of the coil spring 59 is not limited to such a finely wound spring. For example, the coil spring may not be finely wound with a small pitch over the entire spring, but wound such that a central portion which is inserted in the through hole 57*a* of the rolling contact roller 57 is a fine-pitch spring and both end portions are coarse-pitch springs. As an alternative, the coil spring may be a spring coarsely wound in its entirety.

By using the coil spring wound such that the central portion is a fine-pitch spring and both the end portions are coarse-pitch springs, the resilient urging force imposed upon the spherical body from the rolling contact roller by the coil spring can be easily selected to any desired value.

Both the ends 59*a*, 59*a* of the coil spring 59 are held against upper end surfaces 60*a*' of the cross-shaped auxiliary posts 60*a*, and are caught by grooves (not shown) formed in the posts 60 to be kept from slipping off from the posts.

With the above structure, the spherical body can be pressed upon both the driven rollers under even forces by arranging the rolling contact roller on a straight line connecting a point where the axes of the first and second driven rollers cross each other and the center of the spherical body.

A method of assembling the input device 4 having the above construction will now be described by primarily referring to FIGS. 9 to 11.

Figure 9:
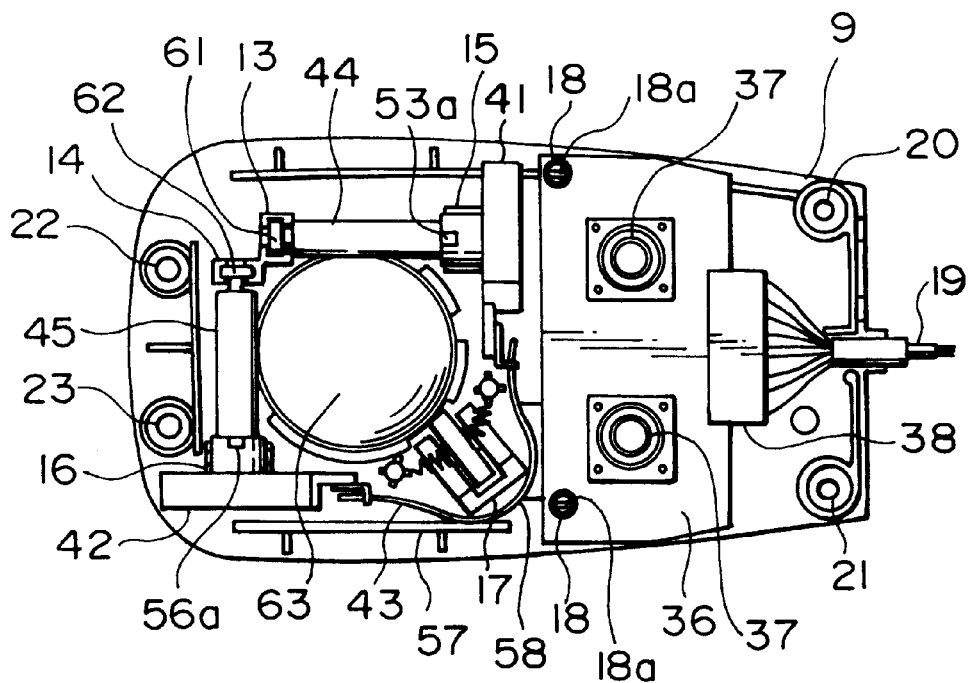
FIG. 9 is a top view of the input device of the present invention with the upper case removed.
Figure 10:
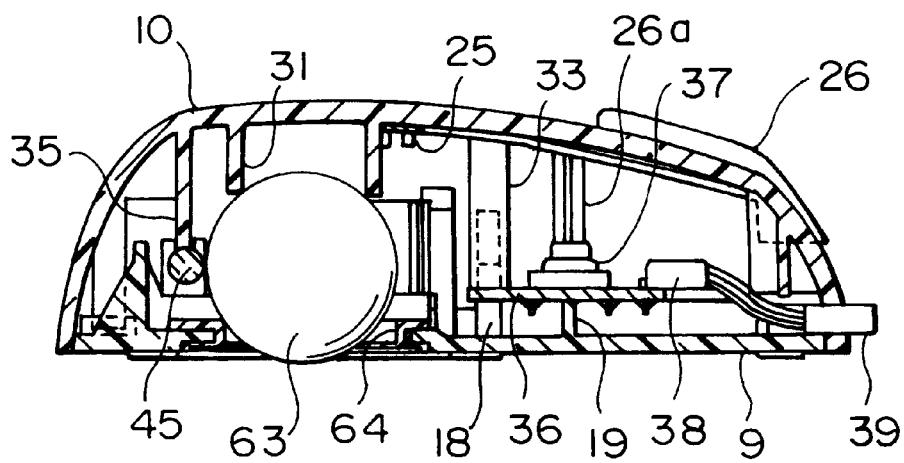
FIG. 10 is a longitudinal sectional view of the entire input device of the present invention in its assembled state.
Figure 11:
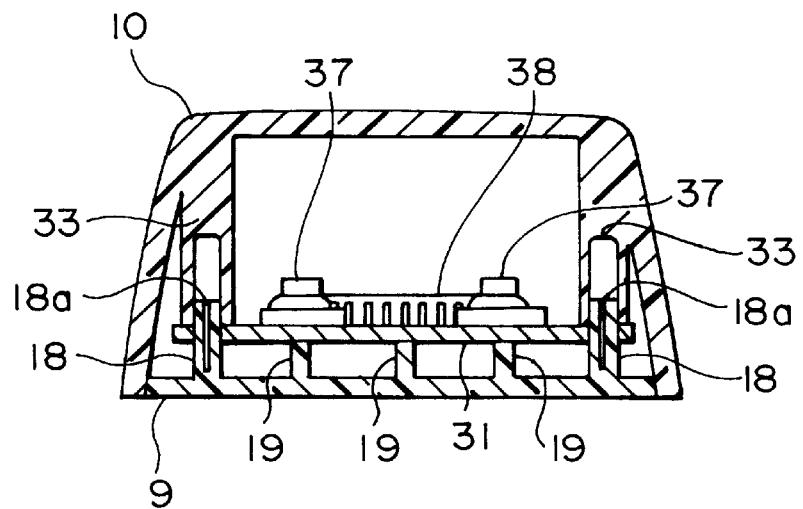
FIG. 11 is a transverse sectional view of the entire input device of the present invention in its assembled state.

FIG. 9 is a top view of the input device with the upper case 10 removed, FIG. 10 is a sectional view of the input device taken in the longitudinal direction of the case 8, and FIG. 11 is a sectional view of the input device taken in the transverse direction of the case 8.

First, as shown in FIG. 9, the metal bearings 61, 62 at one ends of the first and second driven rollers 44, 45 are engaged respectively in the recessed slots 13*a*, 14*a* of the bearing retainers 13, 14 erected on the lower case 9, and the bearing portions 53, 56 of the first and second encoders 41, 42 are engaged respectively in the holder retainers 15, 16. At this time, the switch board 36 (see FIG. 36) connected to the first and second encoders 41, 42 through the film board 43 is simultaneously placed and held on the lower case 9. The first and second encoders 41, 42 are so locked as not to rotate because their positioning projections 53*b* are located respectively in the holder retainers 15, 16.

The first and second driven rollers 44, 45 are thereby disposed on the lower case 9 in the predetermined positions such that the roller axes cross each other perpendicularly.

On the other hand, the switch board 36 is positioned on the lower case 9 in the predetermined position and rested on the three support projections 19 by fitting the two positioning holes 36*a* of the switch board 36 over the elastic projections 18 erected on the lower case 9. At this time, since a split groove 18*a* is axially formed at the center of each of the elastic projections 18, the switch board 36 can be easily fitted over the elastic projections 18 even if the size between the positioning holes 36*a* of the switch board 36 is somewhat varied due to temperature changes and machining errors resulted during the boring process.

The above assembling work of the first and second driven rollers 44, 45, the first and second encoders 41, 42 and the switch board 36 onto the lower case 9 can be performed in a condition where those components are kept together as one unit through the flexible film board 43. Accordingly, the components will not separate individually and troublesome soldering work after the assembly is no longer required. As a result, the components can be very easily assembled.

Next, an assembly of the rolling contact roller 57 and the coil spring 59 inserted in the through hole 57*a* at the axial center of the former is placed in the open room 17*a* of the container 17, and both the ends 59*a*, 59*a* of the coil spring 59 are held respectively by the pair of posts 60, 60.

The above assembling work may be performed prior to the assembling work of the first and second driven rollers 44, 45.

After thus assembling the primary components of the detecting unit on the lower case 9 in the predetermined positions, the upper case 10 is placed over the lower case 9 and screws (not shown) are screwed into the screw insertion holes 20, 21, 22, 23 and the screw insertion holes 27, 28, 29, 30, thereby joining the lower case 9 and the upper case 10 together, as shown in FIGS. 10 and 11.

Joining the lower case 9 and the upper case 10 together results in that, of the components of the detecting unit on the lower case 9 in the predetermined positions, both the metal bearings 61, 62, the projections 53*a*, 56*a* of the first and second encoders 41, 42, the tops of the peripheral walls of the holders 46, 55 are pressed by the pressing wall 35 projecting down from the upper case 10, whereby the first and second driven rollers 44, 45 and the first and second encoders 41, 42 are fixedly held between both the cases 9, 10. Further, the tubular projections 33, fitted over the elastic projections 18, and the pressing ribs 34 are brought at their lower ends into contact with an upper surface of the switch board 36. Thus, the switch board 36 is fixedly held in place by the tubular projections 33, the pressing ribs 34, and the three support projections 19 erected on the lower case 9.

The two push switches 37 are fixedly soldered onto the upper surface of the switch board 36, as described above. On the other hand, the two switch levers 26 are fixed at their one ends to the upper wall portion of the upper case 10, and actuating members 26*a* are vertically extended down from the underside of the switch levers 26. The actuating members 26*a* have lower end surfaces which are positioned to face the tops of the push switches 37 when the lower case 9 and the upper case 10 are joined together. Accordingly, when the operator pushes down any of the switch levers 26 projecting out of the upper wall portion of the upper case 10, the actuating member 26*a* comes into contact the push switch 37 to effect a desired switching operation.

After joining the lower case 9 and the upper case 10 together as explained above, the spherical body 63 which is rotated upon operation of the input device and formed of a steel ball is inserted into the case 8 through the opening 11 of the lower case 9. Subsequently, the lid member 64 having an opening 64a is fixedly fitted to a peripheral edge of the opening 11 of the lower case 9. The rotated spherical body 63 is held within the case in a rollable manner by the annular rib 31 projecting from the upper case 10 and an annular retaining portion 64b of the lid member 64 such that a lowermost portion of the spherical body 63 is exposed downward through the opening 64a of the lid member 64.

Figure 12:
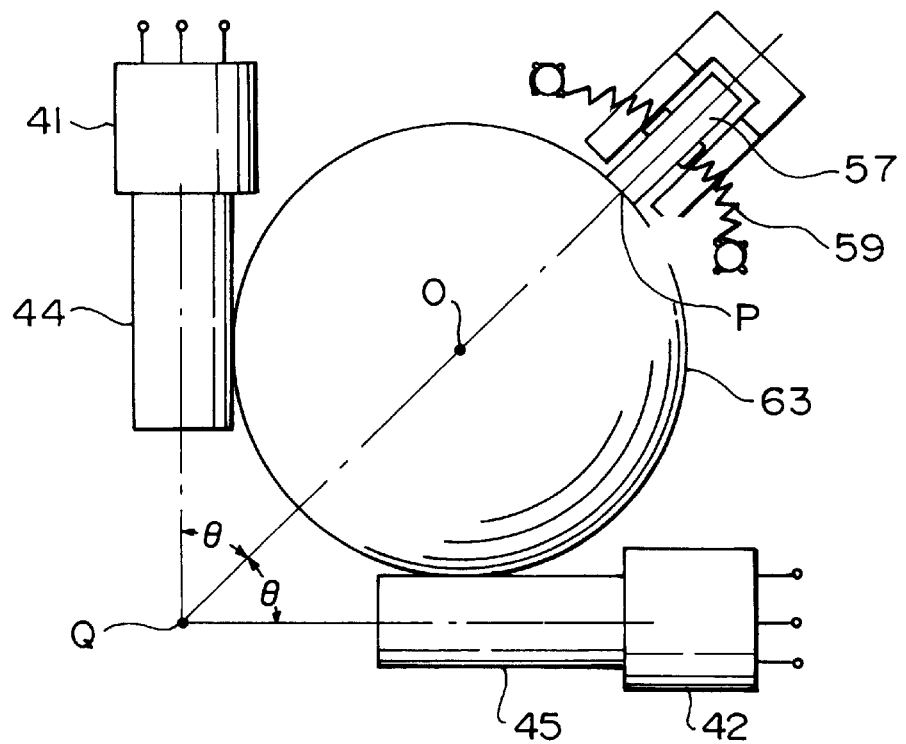
FIG. 12 is a view for explaining the principle of detecting the amount of rotation in the input device.
Figure 13:
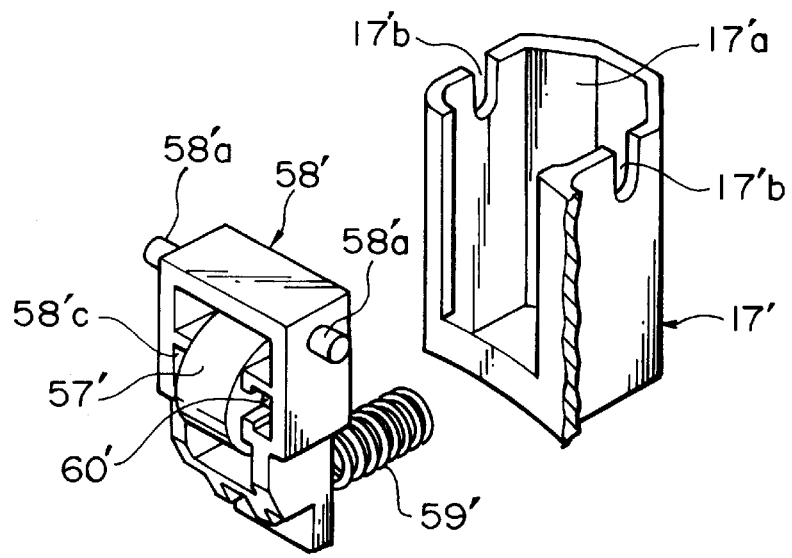
FIG. 13 is an exploded perspective view of conventional frictional force applying means made up of a rolling contact roller, support shafts, a container and a coil spring.
Figure 14:
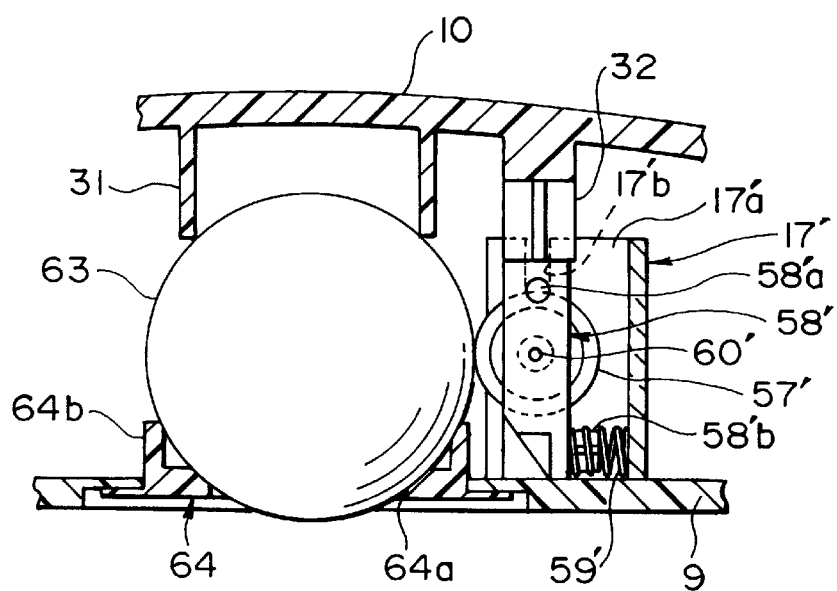
FIG. 14 is a sectional view of the conventional frictional force applying means in an assembled state.

The principle of detecting the amount of rotation in the above embodiment will now be explained with reference to FIG. 12.

The rotated spherical body 63 is held in pressure contact with the first and second driven rollers 44, 45 by the rolling contact roller 57. The first and second driven rollers 44, 45 have the axes crossing each other perpendicularly and come into contact with the rotated spherical body 63 in orthogonal directions.

The rolling contact roller 57 is arranged on a straight line connecting a point Q where the axes of the first and second driven rollers 44, 45 cross each other and the center O of the rotated spherical body 63. Then, the resilient urging force of the coil spring 59 causes the rolling contact roller 57 to press the rotated spherical body 63 against the first and second driven rollers 44, 45 under even forces.

Further, the first and second encoders 41, 42 are coupled to the ends of the first and second driven rollers 44, 45 which serve as rotary shafts for the encoders. The first and second encoders 41, 42 detect the amounts of rotation of the first and second driven rollers 44, 45, respectively. Specifically, the amount of rotation of the rotated spherical body 63 is detected by being divided into components in the X- and Y-directions. From the detected components, the direction and amount of rotation of the rotated spherical body 63 can be determined.

According to the present invention, as described above, the frictional force applying means comprises the rolling contact roller held in rolling contact with the rotated spherical body, the resilient member rotatably supporting the rolling contact roller, and the support member holding at least one end of the resilient member. Accordingly, the frictional force applying means of the present invention does not need a part corresponding to the roller support member which has been employed in the conventional frictional force applying means, and the individual parts are simple in configuration. It is thus possible to provide an X-Y direction input device which requires the smaller number of parts and is less costly in manufacture and machining.

Also, according to the present invention, the resilient member is a coil spring, the coil spring is inserted in the through hole formed at the axial center of the rolling contact roller, and both the ends of the coil spring are attached to the support members which are provided on the side nearer to the rotated spherical body than the axial center of the rolling contact roller. This enables the rolling contact roller to be brought into rolling contact with the rotated spherical body without strain by the resilient urging force of the coil spring. As a result, the rotated spherical body can be resiliently urged upon the first and second driven rollers under even forces.

Further, according to the present invention, the coil spring is wound such that the central portion is a fine-pitch spring and both the end portions are coarse-pitch springs. This provides the following advantages. Since the central portion of the coil spring inserted through the axial center of the rolling contact roller is wound with a fine pitch, the rolling contract roller can roll smoothly. Also, since both the end portions of the coil spring is wound with a coarse pitch, the resilient urging force imposed upon the spherical body from the rolling contact roller by the coil spring can be easily selected to any desired value.

What is claimed is:

1. An X-Y direction input device comprising a rotated spherical body arranged in a rotatable manner, a first driven roller contacting said rotated spherical body to be rotatable by rotating force of said rotated spherical body, a second driven roller contacting said rotated spherical body to be rotated by rotating force of said rotated spherical body and having an axis substantially perpendicular to the axis of said first driven roller, first rotational amount detecting means for detecting an amount of rotation of said first driven roller, second rotational amount detecting means for detecting an amount of rotation of said second driven roller, and frictional force applying means for resiliently urging said rotated spherical body toward said first driven roller and said second driven roller frictional forces between said rotated spherical body and both said driven rollers, said frictional force applying means comprising a rolling contact roller held in rolling contact with said rotated spherical body, a resilient member rotatably supporting said rolling contact roller, and a support member holding at least one end of said resilient member, wherein said resilient member is a coil spring, said coil spring being inserted in a through hole formed at the axial center of said rolling contact roller, both ends of said coil spring being attached to support members which are provided on the side nearer to said rotated spherical body than the axial center of said rolling contact roller.

2. The X-Y direction input device according to claim 1, wherein said coil spring is wound such that a central portion is a fine-pitch spring and both end portions are coarse-pitch springs.

* * * * *

UNITED STATES PATENT AND TRADEMARK OFFICE
CERTIFICATE OF CORRECTION

PATENT NO. : 6,097,370  
DATED : August 1, 2000  
INVENTOR(S) : Nobuhiro Oura et al.

It is certified that error appears in the above-identified patent and that said Letters Patent is hereby corrected as shown below:

Claim 1,
Line 6, change "rotated by" to -- rotatable by --.

Signed and Sealed this

Twenty-fifth Day of December, 2001

Attest:

JAMES E. ROGAN
*Director of the United States Patent and Trademark Office*

*Attesting Officer*